(12) United States Patent
Kitagawa

(10) Patent No.: US 8,833,204 B2
(45) Date of Patent: Sep. 16, 2014

(54) REVERSE IDLER SHAFT SUPPORTING STRUCTURE OF TRANSMISSION

(71) Applicant: Suzuki Motor Corporation, Shizuoka-ken (JP)

(72) Inventor: Takashi Kitagawa, Shizuoka-ken (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 64 days.

(21) Appl. No.: 13/744,073

(22) Filed: Jan. 17, 2013

(65) Prior Publication Data

US 2013/0239748 A1    Sep. 19, 2013

(30) Foreign Application Priority Data

Mar. 19, 2012   (JP) .................................. 2012-061890

(51) Int. Cl.
  *F16H 57/02*     (2012.01)
  *F16H 57/021*    (2012.01)
  *F16H 3/08*      (2006.01)

(52) U.S. Cl.
  CPC ...... *F16H 57/021* (2013.01); *F16H 2003/0822* (2013.01)
  USPC ..................................................... 74/606 R

(58) Field of Classification Search
  USPC ................... 74/473.1, 473.22, 473.36, 606 R
  See application file for complete search history.

(56) References Cited

U.S. PATENT DOCUMENTS

| | | | | |
|---|---|---|---|---|
| 4,222,283 A | * | 9/1980 | Nagy | 74/467 |
| 5,509,329 A | * | 4/1996 | Jackson et al. | 74/606 R |
| 5,582,071 A | * | 12/1996 | Fujii | 74/411.5 |
| 5,966,998 A | * | 10/1999 | Hara et al. | 74/606 R |
| 6,109,393 A | * | 8/2000 | Toyota et al. | 184/6.12 |
| 7,305,906 B2 | * | 12/2007 | Sander | 74/606 R |
| 7,694,597 B2 | * | 4/2010 | Nishi et al. | 74/325 |
| 2008/0087125 A1 | * | 4/2008 | Funahashi | 74/467 |

FOREIGN PATENT DOCUMENTS

| | | |
|---|---|---|
| JP | 59-7953 U | 1/1984 |
| JP | 2-34849 U | 3/1990 |

* cited by examiner

*Primary Examiner* — Vicky Johnson
(74) *Attorney, Agent, or Firm* — Alston & Bird LLP

(57) ABSTRACT

The present invention is a reverse idler shaft supporting structure for a transmission characterized in that a case-side support portion is formed in an end wall, which is disposed at an axial end portion of a transmission case, the case-side support portion extending to the vicinity of another axial end portion of the reverse idler shaft along the reverse idler shaft; an arm portion is formed on a support bracket, the arm portion extending to the case-side support portion from the periphery of a support hole which is formed on the support bracket; a curved surface portion which takes on a circular arc shape centering on a shaft center of the reverse idler shaft and is joined with one another is formed on the case-side support portion and the arm portion, respectively; and a bolt is disposed such that the central axis thereof passes through each curved surface and is oriented toward the shaft center of the reverse idler shaft.

4 Claims, 7 Drawing Sheets

REVERSE IDLER SHAFT SUPPORTING STRUCTURE OF TRANSMISSION

CROSS-REFERENCE TO RELATED APPLICATIONS

The present application claims priority to Japanese Patent Application No. 2012-061890 filed Mar. 19, 2012.

BACKGROUND OF THE INVENTION

1. Field of the Invention

The present invention relates to a reverse idler shaft supporting structure of a transmission, and particularly relates to a reverse idler shaft supporting structure of a transmission, in which the ease of assembly of a reverse idler shaft, which rotatably supports a reverse idler gear in a transmission, onto a transmission case is enhanced.

2. Description of Related Art

In a transmission, gears for forward and reverse driving are supported on shafts and are assembled onto a transmission case. One conventional way to assemble a reverse idler gear is to dispose a reverse idler gear rotatably on a reverse idler shaft and to assemble them onto a transmission case.

Japanese Utility Model Laid-Open No. 59-7953 and Japanese Utility Model Laid-Open No. 2-34849 disclose a structure in which both ends of a reverse idler shaft are supported by means of a support hole formed in an end wall of a transmission case, and a support hole formed on a support bracket that is fastened to the transmission case with a bolt.

SUMMARY OF THE INVENTION

Meanwhile, in a transmission, when the reverse idler gear is a helical gear which is constantly in mesh with a reverse drive gear and a reverse driven gear, and is disposed in the vicinity of an end wall located in an inner part of the transmission case, the reverse idler gear is assembled onto the transmission case by the following procedure.

In assembly, first, the reverse idler gear is disposed at a position where it meshes with the reverse drive gear and the reverse driven gear. Then, the reverse idler shaft is inserted into a through hole at the center of the reverse idler gear, and one axial end portion thereof is inserted into a support hole formed in an end wall of the transmission case, while the other axial end portion is supported in a support hole on a support bracket. Thereafter, the support bracket is fastened to the transmission case with a bolt.

On this occasion, the structure of Japanese Utility Model Laid-Open No. 59-7953 has a problem in that since the support bracket is fastened to an end wall, which is located further inside the transmission case than the reverse idler gear is, with a bolt, the work space is small and assembling operation is difficult. Moreover, the structure of Japanese Utility Model Laid-Open No. 2-34849 also has a problem in that when assembling the support bracket, positioning thereof with respect to the transmission case is difficult, leading to a decrease in the ease of assembly.

It is an object of the present invention to provide a reverse idler shaft supporting structure of a transmission, which can enhance the ease of assembly of a reverse idler shaft onto a transmission case even when the reverse idler gear is a helical gear and is disposed in an inner portion of a transmission case.

The present invention is a reverse idler shaft supporting structure of a transmission, comprising: a transmission case; a reverse idler gear made up of a helical gear; and a reverse idler shaft that rotatably supports the reverse idler gear, wherein with the reverse idler gear being disposed in the vicinity of an end wall disposed in an axial end portion of the transmission case, one axial end portion of the reverse idler shaft is inserted into a support hole formed in the end wall so as to be supported on the transmission case, and on the other hand, another axial end portion of the reverse idler shaft is inserted into a support hole formed on a support bracket, and is supported on the transmission by the support bracket being fastened to the end wall with a bolt, the reverse idler shaft supporting structure of a transmission being characterized in that: a case-side support portion is formed in the end wall, the case-side support portion extending to the vicinity of the other axial end portion of the reverse idler shaft along the reverse idler shaft; an arm portion is formed in the support bracket, the arm portion extending to the case-side support portion from the periphery of the support hole which is formed on the support bracket; a curved surface portion which takes on a circular arc shape centering on a shaft center of the reverse idler shaft and is joined with one another is formed on the case-side support portion and the arm portion, respectively; and the bolt is disposed such that the central axis thereof passes through the curved surface and is oriented toward the shaft center of the reverse idler.

In a transmission, when the reverse idler gear which is disposed in an inner portion of the transmission case is a helical gear, it is necessary to assemble the reverse idler shaft after disposing the reverse idler gear at a position in mesh with a reverse drive gear and a reverse driven gear.

Since the present invention is configured such that a curved surface portion which has a circular arc shape and is joined with one another is formed on each of the case-side support portion of the end wall and the arm portion of the support bracket, and a bolt for fastening the arm portion to the case-side support portion is disposed such that the central axis thereof passes through the curved surface portion, and is oriented toward the shaft center of the reverse idler shaft, this allows the work to fasten the arm portion of the support bracket to the case-side support portion of the transmission case to be performed in a relatively large space on the opposite side of the end wall with respect to the reverse idler gear in the direction along the reverse idler shaft so that the work efficiency in assembling the support bracket to the transmission case is enhanced.

Furthermore, since the present invention is configured such that the curved surface potions, which each take on a circular arc shape centering on the shaft center of the reverse idler shaft, and are joined with each other, are formed respectively in the case-side support portion and the arm portion, it is possible to assemble the support bracket to the reverse idler shaft in a state in which the support bracket is rotated centering on the reverse idle shaft to a position at which there is no interference with the case-side support portion and the peripheral parts.

Thus, by rotating the support bracket to an assembly position with the curved surface portion of the support bracket being placed along the curved surface portion of the case-side support portion, it is possible to fasten the arm portion of the support bracket to the case-side support portion of the transmission case with a bolt.

Thus, the present invention can enhance the ease of assembly of the reverse idler shaft to the transmission case even when the reverse idler gear, which is disposed in an inner portion of the transmission case, is a helical gear.

DETAILED DESCRIPTION

Hereafter, embodiments of the present invention will be described based on the drawings.

Figure 1:
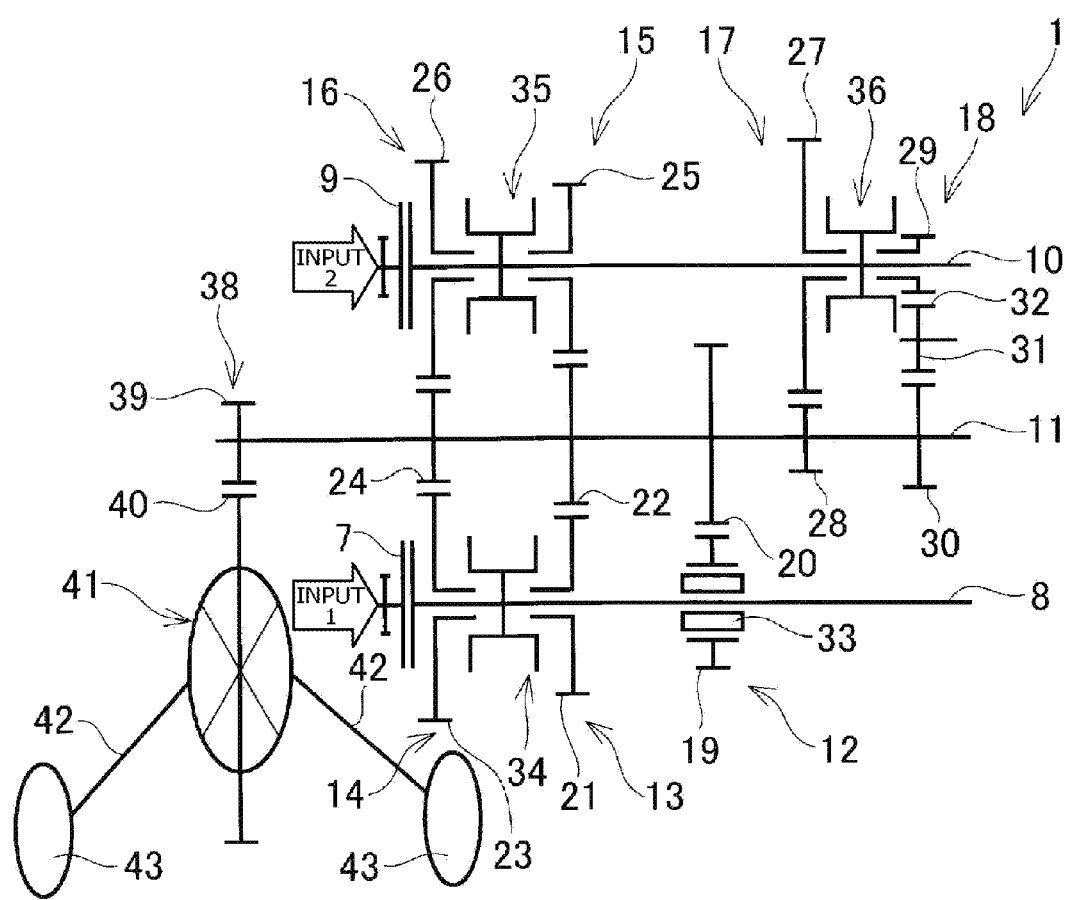
FIG. 1 is a structural diagram of a transmission.
Figure 2:
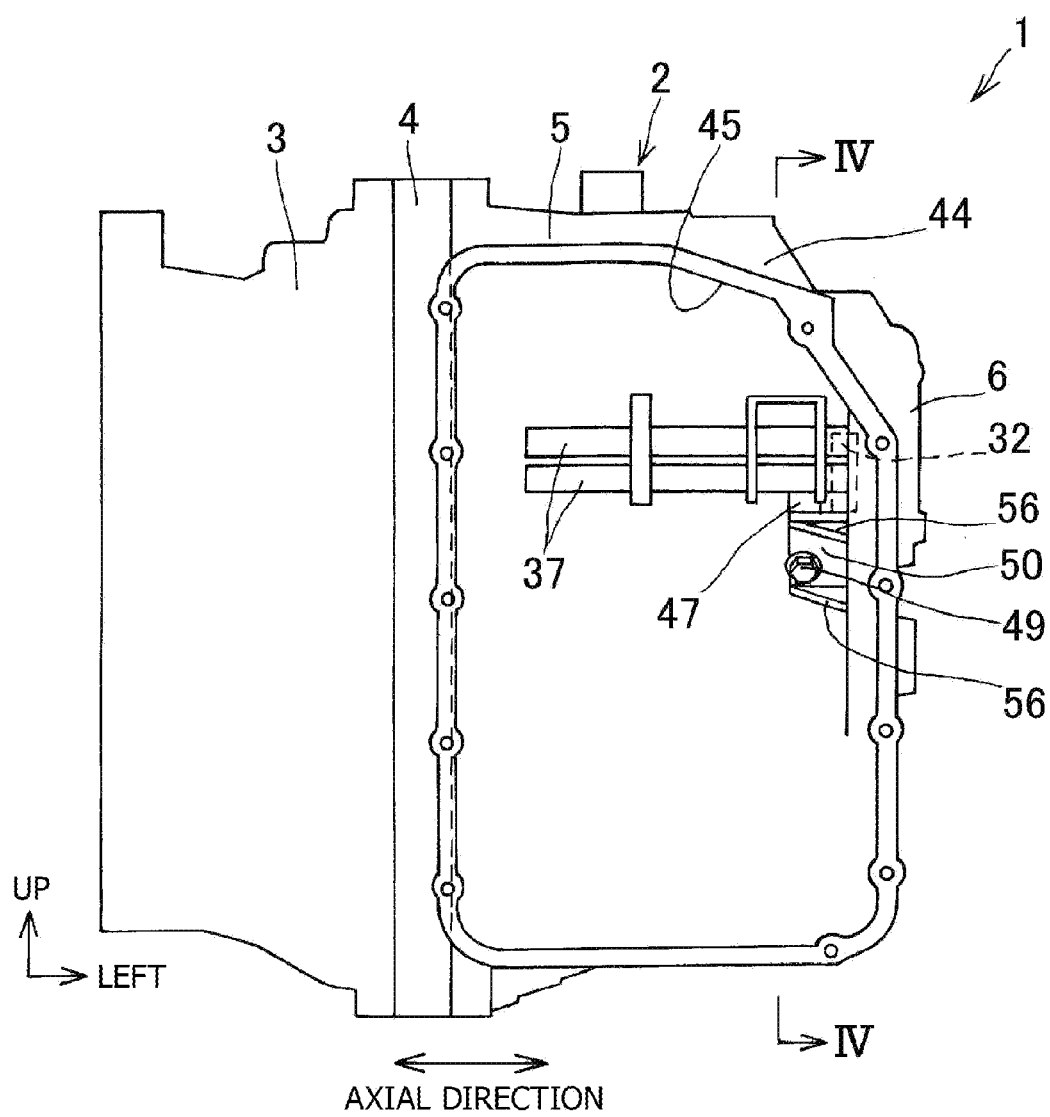
FIG. 2 is a front view of the transmission.

FIGS. 1 to 11 show embodiments of the present invention. In FIGS. 1 and 2, reference numeral 1 denotes a transmission. The transmission 1 includes a transmission case 2 as shown in FIG. 2. The transmission case 2 is made up of a first case portion 3 on the internal combustion engine side, a second case portion 4 in the middle, and a third case portion 5 that is away from the internal combustion engine, and an end wall 6 is provided in an end portion of the third case portion 5 that is away from the internal combustion engine.

The transmission 1 is configured, as shown in FIG. 1, such that a first input shaft 8 to which driving force of the internal combustion engine is transferred via a first clutch 7, and a second input shaft 10 to which the driving force of the internal combustion engine is transferred vie a second clutch 9 are disposed in parallel with the output shaft 11 in the transmission case 2. The end wall 6 of the transmission case 2 is disposed at an axial end portion, which is on the side away from the internal combustion engine, of each of the first input shaft 8, the second input shaft 10, and the output shaft 11.

The transmission 1 is configured such that a gear train constituting shift stages of odd-numbered stages is disposed between the first input shaft 8 and the output shaft 11, and a gear train constituting shift stages of even-numbered stages is disposed between the second input shaft 10 and the output shaft 11. The gear trains constituting shift stages of odd numbered stages are made up of a first-speed gear train 12, a third-speed gear train 13, and a fifth-speed gear train 14. The gear trains constituting shift stages of even-numbered stages are made up of a second-speed gear train 15, a fourth-speed gear train 16, and a sixth-speed gear train 17. The transmission 1 is configured such that a reverse gear train 18 is disposed at an end portion of the second input shaft 10 on which the sixth-speed gear train 17 constituting a shift stage of this even numbered stage, and on the outside of the sixth-speed gear train 17 located farthest away from the second clutch 9.

The first-speed gear train 12 is made up of a first drive gear 19 which is rotatably disposed in the vicinity of another end portion which is farthest away from the first clutch 7 in the axial direction of the first input shaft 8, and a first driven gear 20 which is non-rotatably disposed on the output shaft 11 so as to mesh with the first drive gear 19 at a position corresponding to the first drive gear 19.

The third-speed gear train 13 is made up of a third drive gear 21 which is rotatably disposed on the side closer to the first clutch 7 with respect to the first drive gear 19 in the axial direction of the first input shaft 8, and a second/third-speed driven gear 22 which is non-rotatably disposed on the output shaft 11 so as to mesh with the third drive gear 21 at a position corresponding to the third drive gear 21.

The fifth-speed gear train 14 is made up of a fifth drive gear 23 which is rotatably disposed on the side closer to the first clutch 7 with respect to the third drive gear 21 in the axial direction of the first input shaft 8, and a fourth/fifth driven gear 24 which is non-rotatably disposed on one axial side of the second/third-speed driven gear 22 of the output shaft 11 so as to mesh with the fifth drive gear 23 at a position corresponding to the fifth drive gear 23.

Further, the second-speed gear train 15 is made up of a second drive gear 25 which is rotatably disposed at a position corresponding to the third drive gear 21 in the axial direction of the second input shaft 10, and the second/third-speed driven gear 22 which is non-rotatably disposed on the output shaft 11 shaft so as to mesh with the second drive gear 25 at a position corresponding to the second drive gear 25.

The fourth-speed gear train 16 is made up of a fourth drive gear 26 which is rotatably disposed at a position corresponding to the fifth drive gear 23 in the axial direction of the second input shaft 10, and the fourth/fifth driven gear 24 which is non-rotatably disposed on the output shaft 11 so as to mesh with the fourth drive gear 26 at a position corresponding to the fourth drive gear 26.

The sixth-speed gear train 17 is made up of a sixth drive gear 27 which is rotatably disposed on the side farther away from the second clutch 9 than the second drive gear 25 is in the axial direction of the second input shaft 10, and a sixth driven gear 28 which is non-rotatably disposed on the side away from the second clutch 9 with respect to the first driven gear 20 of the output shaft 11 is so as to mesh with the sixth drive gear 27 at a position corresponding to the sixth drive gear 27.

Furthermore, the above-described reverse gear train 18 is made up of a reverse drive gear 29 which is rotatably disposed on the side farther away from the second clutch 9 with respect to the sixth drive gear 27 in the axial direction of the second input shaft 10, a reverse driven gear 30 which is non-rotatably disposed on the side farther away from the second clutch 9 than the sixth driven gear of the output shaft 11 at a position corresponding to the reverse drive gear 29, and a reverse idler gear 32 which is rotatably disposed on the reverse idler shaft 31 so as to mesh with the reverse drive gear 29 and the reverse driven gear 30. The reverse idler gear 32 is formed into a helical gear.

The transmission 1 is configured such that the first drive gear 19 is attached to the first input shaft 8 via a one-way clutch 33. A third/fifth meshing clutch 34 which selectively connects the third drive gear 21 and the fifth drive gear 23 with the first input shaft 8 is disposed on the first input shaft 8 between the third drive gear 21 and the fifth drive gear 23.

A second/fourth meshing clutch 35 which selectively connects the second drive gear 25 and the fourth drive gear 26 with the second input shaft 10 is disposed on the second input shaft 10 between the second drive gear 25 and the fourth drive gear 26.

A sixth/reverse meshing clutch 36 which selectively connects the sixth drive gear 27 and the reverse drive gear 29 with the second input shaft 10 on the second input shaft 10 between the sixth drive gear 27 and the reverse drive gear 29.

The third/fifth meshing clutch 34, the second/fourth meshing clutch 35, and the sixth/reverse meshing clutch 36 are operated by a shifter shaft 37 shown in FIG. 2, and selectively connects any one of between the third-speed gear train 13 and the fifth-speed gear train 14, between the second-speed gear train 15 and the fourth-speed gear train 16, and between the sixth-speed gear train 17 and the reverse gear train 18.

Furthermore, the transmission 1 is configured such that a final reduction drive gear 39 of a final reduction gear train 38 is non-rotatably disposed at an end portion of the output shaft 11 on the internal combustion engine side with respect to the fourth/fifth driven gear 24. A final reduction driven gear 40 that meshes with the final reduction drive gear 39 of the final reduction gear train 38 is disposed in a differential unit 41. The differential unit 41 is in communication with a driving wheel 43 via a driving shaft 42.

This allows the transmission 1 to transfer driving force input from the internal combustion engine to the first input shaft 8 or the second input shaft 10, to the output shaft 11 via the first-speed 12 to sixth-speed gear trains to 17 and the reverse gear train 18, and further transfer it to the driving wheel 43 via the differential unit 41 and the driving shaft 42.

Figure 3:
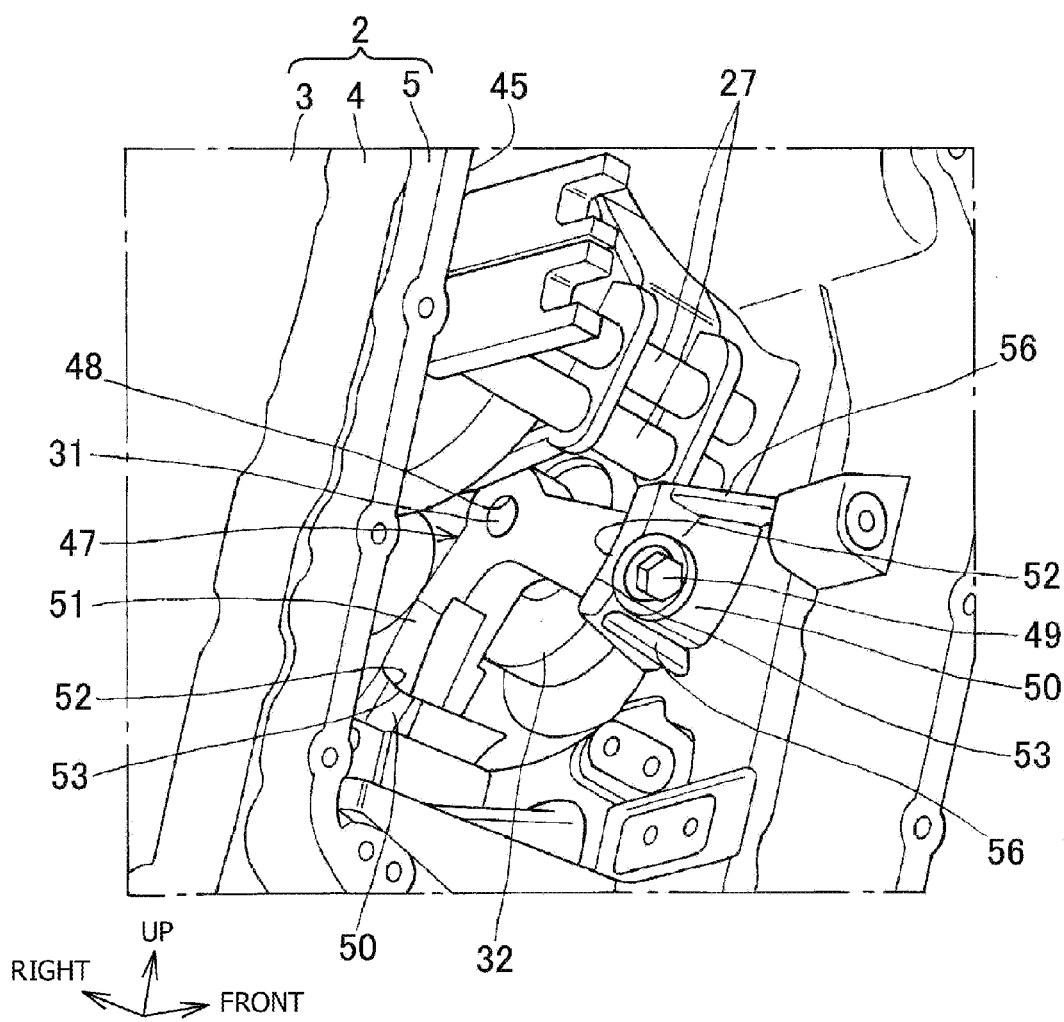
FIG. 3 is a perspective view of a reverse idler shaft and a support bracket, which are assembled to the transmission case.

The reverse idler shaft supporting structure of the transmission 1 includes, as shown in FIGS. 2 and 3, a transmission case 2, a reverse idler gear 32 made up of a helical gear disposed in an inner portion of the transmission case 2, and a reverse idler shaft 31 for rotatably supporting the reverse idler gear 32. The transmission 1 is configured such that the reverse idler gear 32 is disposed in the vicinity of an end wall 6 that is disposed at an axial end portion of a third case portion 5 constituting the transmission case 2. The third case portion 5 constituting the transmission case 2 forms an opening portion 45 in a side wall 44 on the front surface side of the transmission 1 which intersects with the end wall 6 at an end portion in the axial direction. The opening portion 45 is provided so as to face the inner surface of the end wall 6 where the reverse idler gear 32 and the reverse idler shaft 31 are disposed, and is covered with a front cover (not shown).

Figure 4:
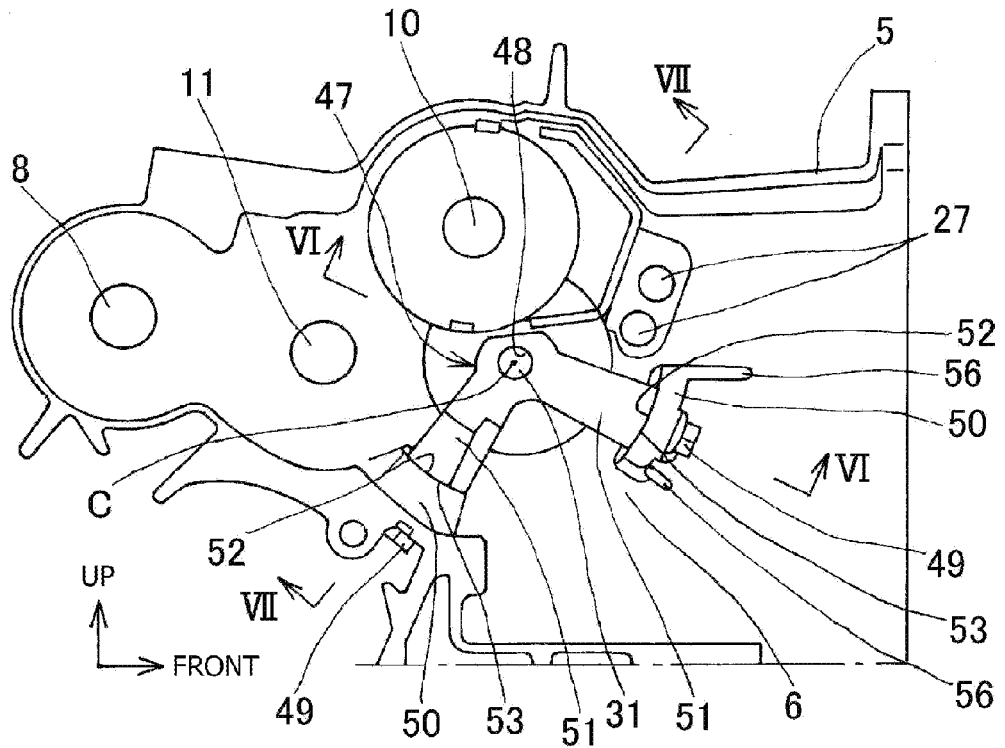
FIG. 4 is a cross-sectional view taken along IV-IV line of FIG. 2.
Figure 5:
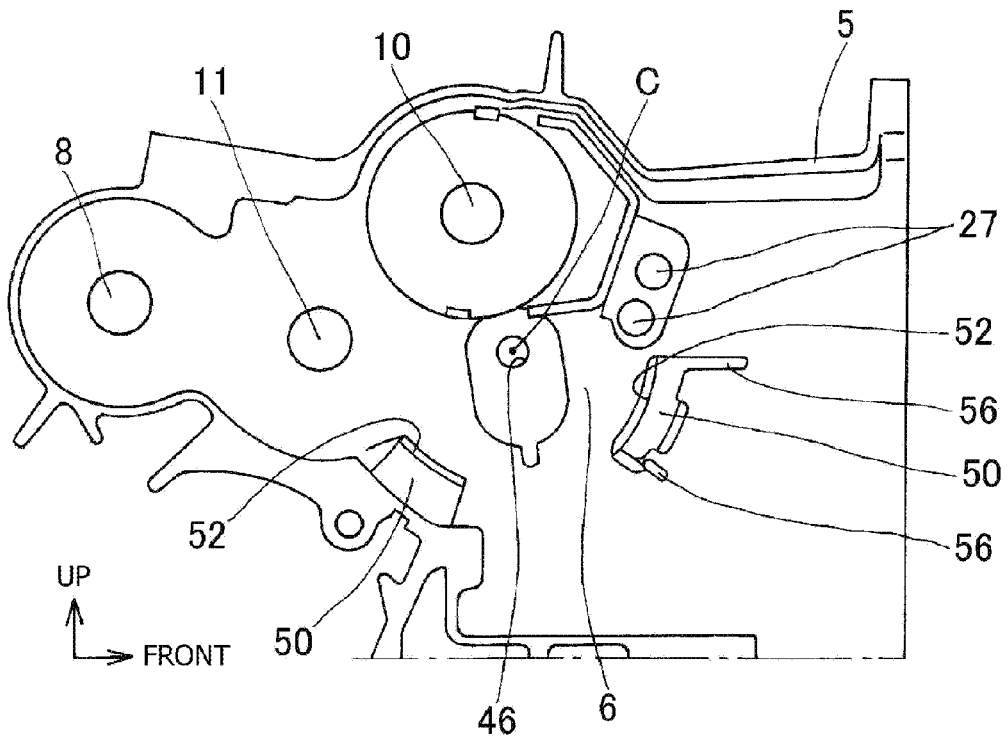
FIG. 5 is a perspective view showing an end wall and a case-side support portion of the transmission case.

The reverse idler shaft 31 is supported on the transmission case 2 by one axial end portion thereof being inserted into a support hole 46 which is formed in the end wall 6, as shown in FIGS. 4 and 5. On the other hand, the reverse idler shaft 31 is supported on the transmission case 2 by the other end portion of the reverse idler shaft 31 being inserted into a support hole 48 which is formed on a support bracket 47, and the support bracket 47 being fastened to the end wall 6 with a bolt 49.

Figure 6:
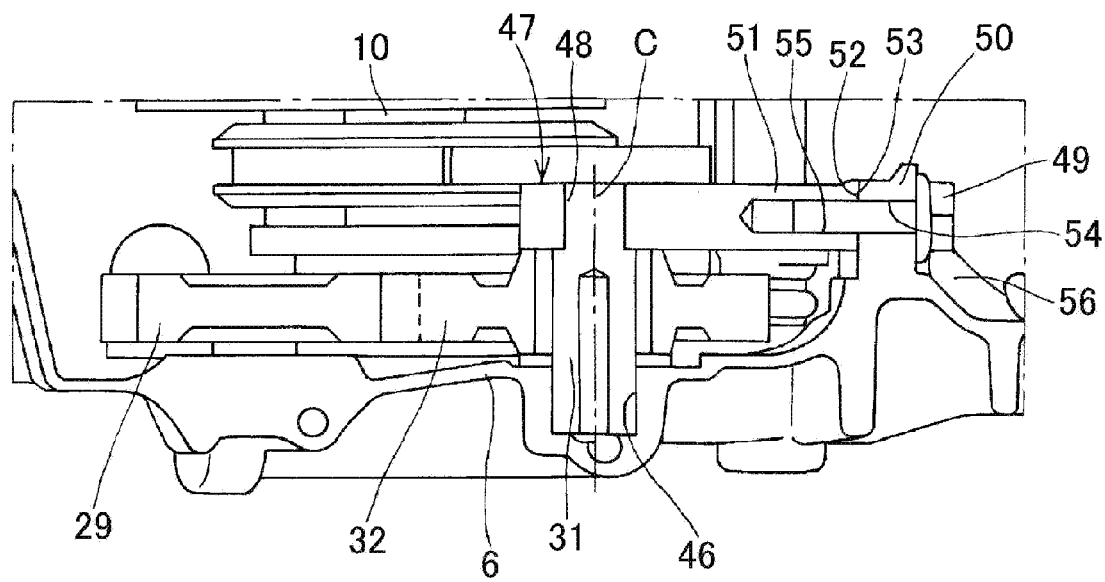
FIG. 6 is a cross-sectional view taken along VI-VI line of FIG. 4.
Figure 7:
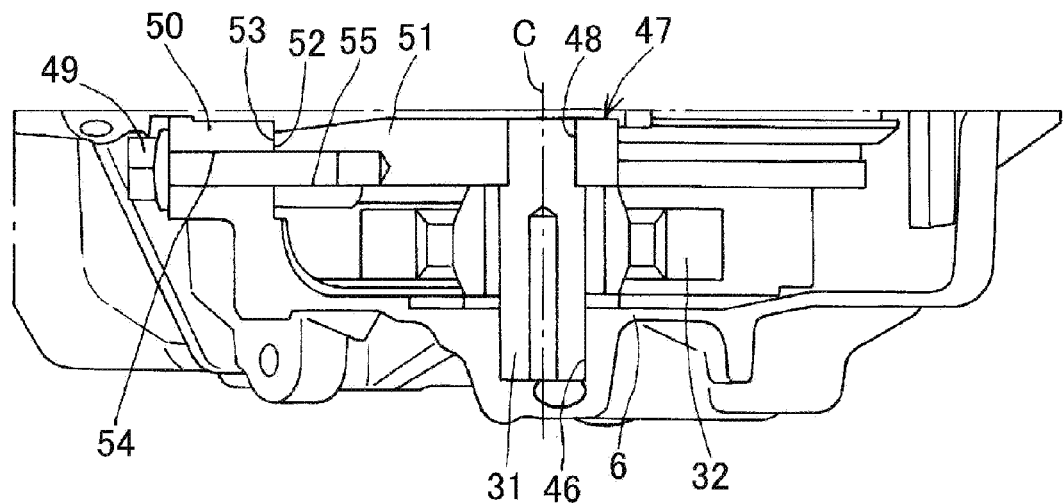
FIG. 7 is a cross-sectional view taken along VII-VII line of FIG. 4.

A case-side support portion 50 is formed on the inner surface of the end wall 6 of the transmission case 2 as shown in FIGS. 6 and 7, the case-side support portion 50 extending to the vicinity of the other axial end portion of the reverse idler shaft 31 along the reverse idler shaft 31. An arm portion 51 is formed in the support bracket 47 as shown in FIG. 4, the a portion 51 extending to the case-side support portion 50 from the periphery of the support hole 48 which is formed on the support bracket 47. A plurality of (two of, in this embodiment) each of the case-side support portions 50 of the end wall 6 and the arm portions 51 of the support bracket 47 are provided.

The two case-side support portions 50 are disposed with a gap therebetween along a circumference centering on the shaft center C of the reverse idler shaft 31 when seen from the direction of the shaft center of the reverse idler shaft 31, as shown in FIGS. 4 and 5. The two arm portions 51 are disposed so as to radially extend toward the each of the case-side support portions 50 from the outer circumference of the support hole 48 formed on the support bracket 47.

A curved surface portion 52 and a curved surface portion 53 are formed respectively in the two case-side support portions 50 and the two arm portions 51. The curved surface portion 52 of the case-side support portion 50 and the curved surface portion 53 of the arm portion 51 are formed into a curved surface which takes on a circular arc shape centering on the shaft center of the reverse idler shaft 31, and which has the same curvature to be joined with each other.

As shown in FIGS. 6 and 7, also formed on the case-side support portion 50 is an insertion hole 54 into which a bolt 49 is inserted. Moreover, formed in the arm portion 51 is a screw hole 55 into which the bolt 49 is screwed in coincidence with the insertion hole 54 of the case-side support portion 50. The insertion hole 54 of the case-side support portion 50 and the screw hole 55 of the arm portion 51 are formed, as shown in FIG. 4, so as to coincide with each other to be oriented toward the shaft center C of the reverse idler shaft 31. As a result of this, the bolt 49 is disposed such that its central axis passes through the curved surface portion 52 of the case-side support portion 50 and the curved surface portion 53 of the arm portion 51, and is oriented toward the shaft center C of the reverse idler shaft 31.

Furthermore, the case-side support portion 50 is provided in the back side of the curved surface portion 52 with a reinforcement rib 56 which connects the case-side support portion 50 with the inner surface of the end wall 6.

The reverse idler shaft supporting structure of the transmission 1 is configured to assemble the reverse idler shaft 31 and the reverse idler gear 32 onto the transmission case 2 as shown in FIGS. 8 to 11.

Figure 8:
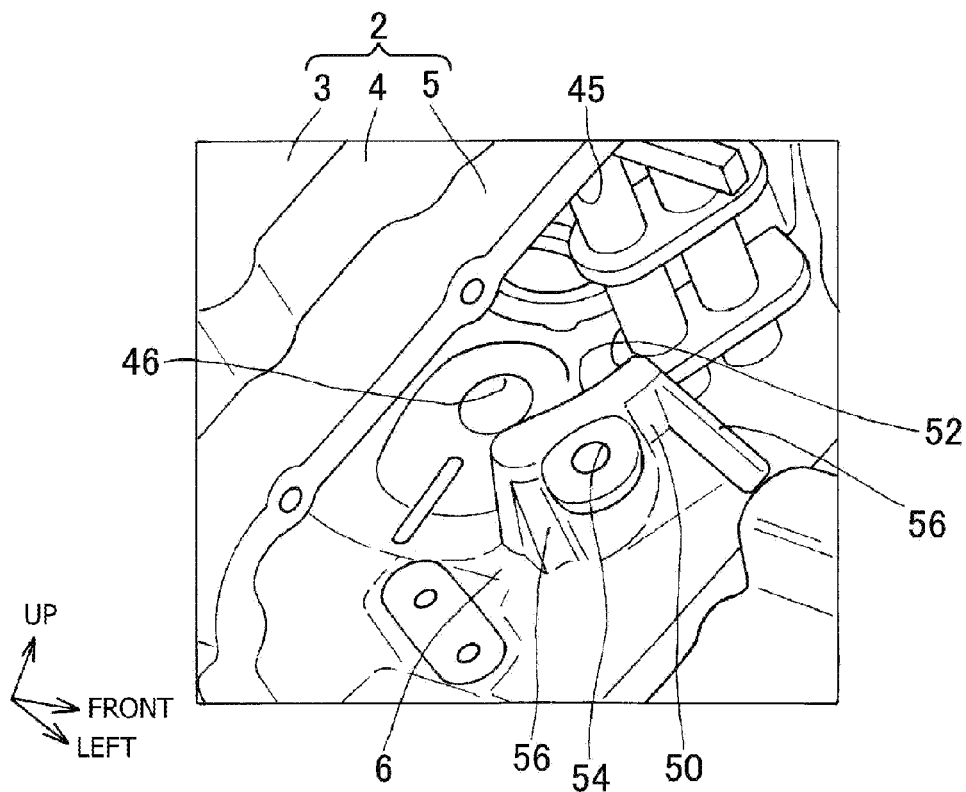
FIG. 8 is a perspective view showing an end wall of the transmission case and a case-side support portion before the reverse idler shaft is assembled.

As shown in FIG. 8, before assembly, the support hole 46 and the case-side support portion 50 which are formed in the inner surface of the end wall 6 located in the inner portion, are disposed so as to be readily viewed from the opening portion 45 of the transmission case 2.

Figure 9:
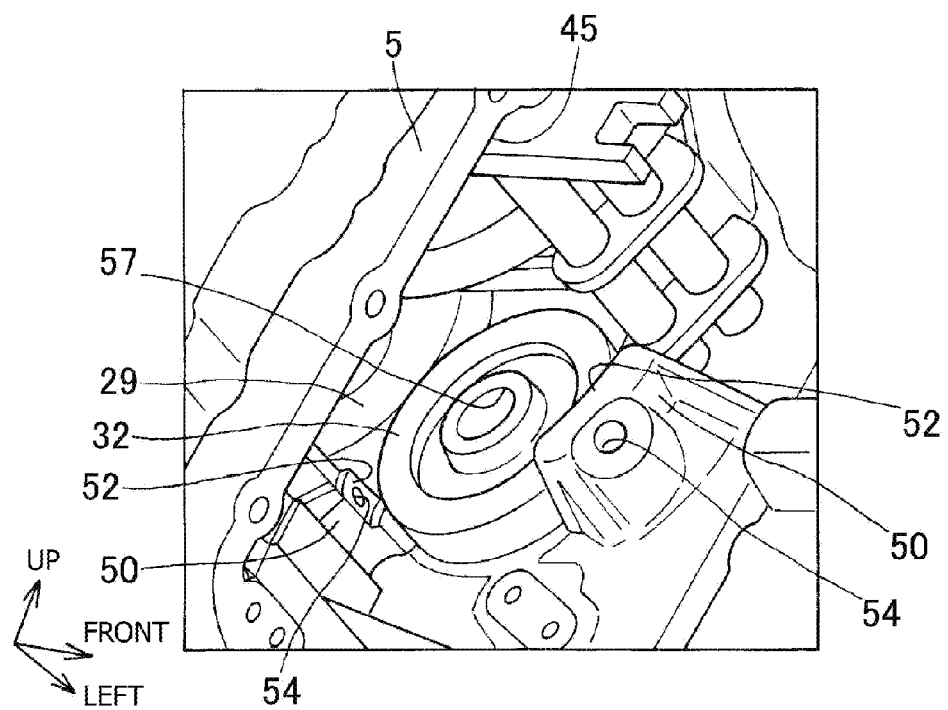
FIG. 9 is a perspective view showing a state in which the reverse idler gear is disposed in the vicinity of the end wall.

As shown in FIG. 9, the reverse idler gear 32 is brought inside the transmission case 2 from the opening portion 45 to be disposed at a position in mesh with the reverse drive gear 29 and the reverse driven gear 30 while adjusting such that the shaft center of the reverse idler gear 32 coincides with the support hole 46 of the end wall 6.

Next, the assembly is performed in such a way that one axial end portion of the reverse idler shaft 31 is rotatably inserted into a through hole 57 at the center of the reverse idler gear 32 to be inserted into the support hole 46 formed in the end wall 6, and the other axial end portion of the reverse idler shaft 31 is inserted into the support hole 48 formed on the support bracket 47.

Figure 10:
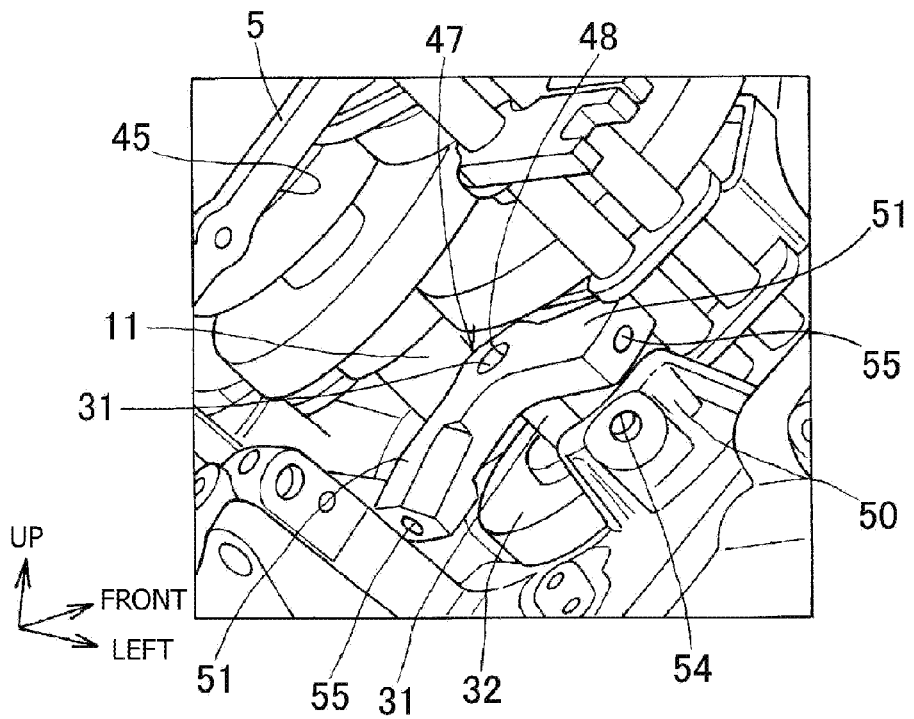
FIG. 10 is a perspective view showing a state in which the reverse idler shaft and the support bracket are being assembled.

At this moment, as shown in FIGS. 2 and 10, the support bracket 47 is assembled into the through hole 57 of the reverse idler gear 32 and the support hole 46 of the end wall 6 with the support bracket 47 being rotated centering on the reverse idler shaft 31 to a position where there is no interference with peripheral parts such as a shifter shaft 37.

Figure 11:
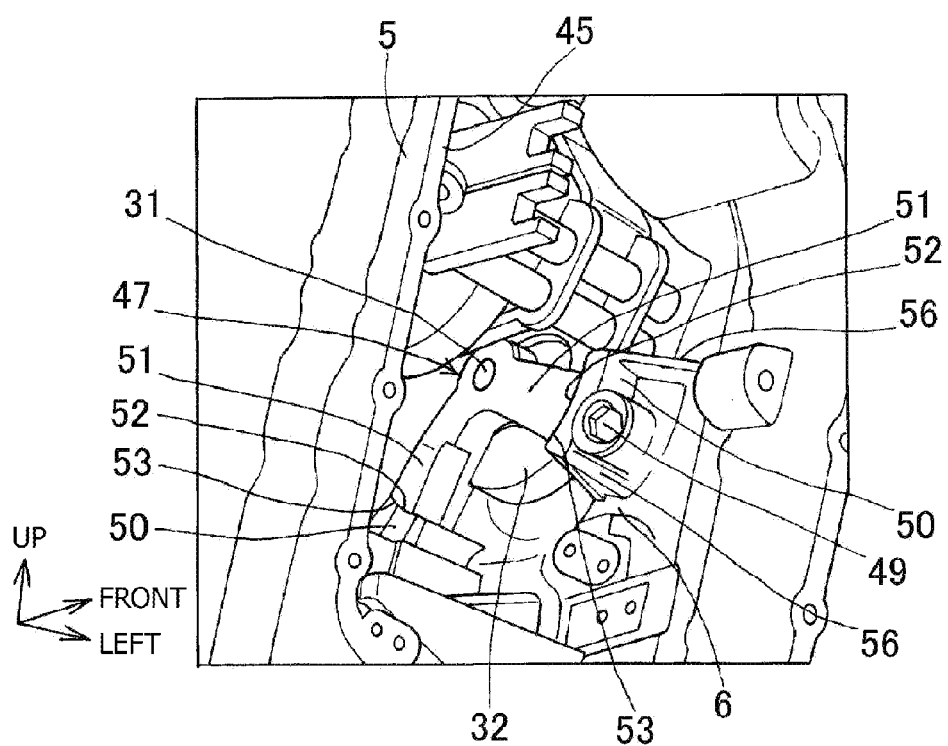
FIG. 11 is a perspective view showing a state in which the assembling of the reverse idler shaft has been completed.

Thereafter, as shown in FIG. 11, the curved surface portion 53 of the arm portion 51 is slid along the curved surface portion 52 of the case-side support portion 50 such that the support bracket 47 is rotated to an assembly position, thereby causing the screw hole 55 of the arm portion 51 to coincide with the insertion hole 54 of the case-side support portion 50. In this state, the arm portion 51 of the support bracket 47 is fastened to the case-side support portion 50 of the transmission case 2 by screwing and tightening the bolt 49, which is inserted into the insertion hole 54 of the case-side support portion 50, into the screw hole 55 of the arm portion 51.

In this way, the reverse idler shaft supporting structure of the transmission 1 is configured such that the curved surface portion 52 and the curved surface portion 53 which each have a circular arc shape and are joined with each other are formed on the case-side support portion 50 of the end wall 6 and the arm portion 51 of the support bracket 47 of the transmission case 2, and a bolt 49 for fastening the arm portion 51 to the case-side support portion 50 is disposed such that the central axis thereof passes through the curved surface portion 52 and the curved surface portion 53, and is oriented toward the shaft center C of the reverse idler shaft 31.

Since this allows the work to fasten the arm portion 51 of the support bracket 47 to the case-side support portion 50 of the transmission case 2 to be performed in a relatively large space on the opposite side of the end wall 6 with respect to the reverse idler gear 32 in the direction along the reverse idler shaft 31, the work efficiency in assembling the support bracket 47 onto the transmission case 2 is enhanced.

Furthermore, since the reverse idler shaft supporting structure of the transmission 1 is configured such that the curved surface portions 52 and 53, which each take on a circular arc shape centering on the shaft center of the reverse idler shaft 31, and are to be joined with each other, are formed respectively in the case-side support portion 50 and the arm portion 51, it is possible to assemble the support bracket 47 to the reverse idler shaft 31 in a state in which the support bracket 47 is rotated centering on the reverse idler shaft 31 to a position at which there is no interference with the case-side support portion 50 and the peripheral parts.

Thus, by rotating the support bracket 47 to an assembly position with the curved surface portion 53 of the arm portion 51 formed on the support bracket 47 being placed along the curved surface portion 52 of the case-side support portion 50, it is possible to fasten the arm portion 51 of the support bracket 47 to the case-side support portion 50 of the transmission case 2 with the bolt 49.

Thus, the reverse idler shaft supporting structure of the transmission 1 can enhance the ease of assembly of the reverse idler shaft 31 onto the transmission case 2 even when the reverse idler gear 32, which is disposed in an inner portion of the transmission case 2, is a helical gear.

Furthermore, since the reverse idler shaft supporting structure of the transmission 1 is configured such that a reinforcement rib 56 which connects the case-side support portion 50 and the end wall 6 is provided in the back side of the curved surface portion 52 of the case-side support portion 50, it is possible to increase the rigidity of the case-side support portion 50 thereby preventing the falling of the reverse idler shaft 31 during the transfer of driving force, while enhancing the ease of assembly of the reverse idler shaft 31 to the transmission case 2.

Furthermore, since the reverse idler shaft supporting structure of the transmission 1 is configured such that respectively two of the case-side support portions 50 and the arm portions 51 of the support bracket 47 are provided, it is possible to support the reverse idler shaft 31 with a plurality of the case-side support portions 50 and the arm portions 51 of the support bracket 47, thereby preventing the falling of the reverse idler shaft 31 during the transfer of driving force.

Furthermore, the reverse idler shaft supporting structure of the transmission 1 is configured such that the case-side support portions 50 are disposed with a gap therebetween along a circumference centering on the shaft center C of the reverse idler shaft 31 when the case-side support portion 50 is seen from the direction of the shaft center of the reverse idler shaft 31, and a plurality of the arm portions 51 radially extending toward the respective case-side support portions 50 from the outer circumference of the support hole 48 formed on the support bracket 47 are provided. This makes it possible to move the arm portion 51 of the support bracket 47 through a gap formed between the case-side support portions 50 from the outside of the case-side support portion 50 to the side of the curved surface portion 52 when the support bracket 47 is assembled onto the transmission case 2, thus enhancing the ease of assembly of the support bracket 47.

The present invention can enhance the ease of assembly of a reverse idler shaft onto a transmission case even when the reverse idler gear is a helical gear, and is disposed in an inner portion of the transmission case, and therefore is applicable to transmissions having a reverse idler gear made up of a helical gear regardless of for a manual or automatic transmission.

What is claimed is:

1. A reverse idler shaft supporting structure of a transmission, comprising: a transmission case; a reverse idler gear made up of a helical gear; and a reverse idler shaft that rotatably supports the reverse idler gear, wherein
with the reverse idler gear being disposed in the vicinity of an end wall disposed in an axial end portion of the transmission case, one axial end portion of the reverse idler shaft is inserted into a support hole formed in the end wall so as to be supported on the transmission case, and
on the other hand, another axial end portion of the reverse idler shaft is inserted into a support hole formed on a support bracket, and is supported on the transmission by the support bracket being fastened to the end wall with a bolt,
the reverse idler shaft supporting structure of a transmission being characterized in that:
a case-side support portion is formed in the end wall, the case-side support portion extending to the vicinity of the other axial end portion of the reverse idler shaft along the reverse idler shaft;
an arm portion is formed in the support bracket, the arm portion extending to the case-side support portion from the periphery of the support hole which is formed on the support bracket;
a curved surface portion which takes on a circular arc shape centering on a shaft center of the reverse idler shaft and is joined with one another is formed on the case-side support portion and the arm portion, respectively; and
the bolt is disposed such that the central axis thereof passes through the curved surface and is oriented toward the shaft center of the reverse idler shaft.

2. The reverse idler shaft supporting structure of a transmission according to claim 1, wherein
a reinforcing rib connecting the case-side support portion with the wall portion is provided in the back side of the curved surface portion of the case-side support portion.

3. The reverse idler shaft supporting structure of a transmission according to claim 1, wherein
a plurality of each of the case-side support portions and the arm portions of the support bracket are provided.

4. The reverse idler shaft supporting structure of a transmission according to claim 3, wherein
the case-side support portions are disposed with a gap therebetween along a circumference centering on the shaft center of the reverse idler shaft when the case-side support portion is seen from the direction of the shaft center of the reverse idler shaft, and the arm portion is made up of a plurality of arm portions radially extending toward each case-side support portion from the outer circumference of a support hole formed on the support bracket.

* * * * *